United States Patent [19]

Stewart

[11] 4,283,770
[45] Aug. 11, 1981

[54] SIGNAL PROCESSOR FOR DIGITAL ECHO CANCELLER

[75] Inventor: Robert C. Stewart, Hinsdale, Ill.

[73] Assignee: Tellabs, Inc., Lisle, Ill.

[21] Appl. No.: 82,710

[22] Filed: Oct. 9, 1979

[51] Int. Cl.³ .......................... H04B 3/20; G06F 7/52
[52] U.S. Cl. ..................... 364/757; 179/170.2
[58] Field of Search ...................... 364/724, 754, 757; 179/15.55 T, 170.2, 170.6, 175.31 E; 340/347 DD

[56] References Cited

U.S. PATENT DOCUMENTS

| | | | |
|---|---|---|---|
| 3,945,002 | 3/1976 | Duttweiler et al. | 340/347 DD |
| 4,007,341 | 2/1977 | Sourgens et al. | 364/724 X |
| 4,064,379 | 12/1977 | Horna | 179/170.2 |
| 4,113,997 | 9/1978 | Horna | 179/170.2 |
| 4,144,417 | 3/1979 | Oshima et al. | 179/170.2 |
| 4,163,287 | 7/1979 | Munter et al. | 364/757 |

Primary Examiner—Jerry Smith
Attorney, Agent, or Firm—Gary, Juettner & Pyle

[57] ABSTRACT

A processor for an echo canceller generates an estimate of an actual echo on an echo path and applies the same to a subtractor circuit in the path to cancel the echo. To generate the echo estimate, the processor multiplies A-law digitally encoded samples of signals which cause the echo by A-law digitally encoded samples of impulse responses of the echo path and sums a plurality of the products. The particular manner of multiplying the A-law samples produces a product which is a precise linear representation of the product of the linear equivalents of the samples, and no errors or approximations occur in the multiplication or in generation of the echo estimate.

37 Claims, 6 Drawing Figures

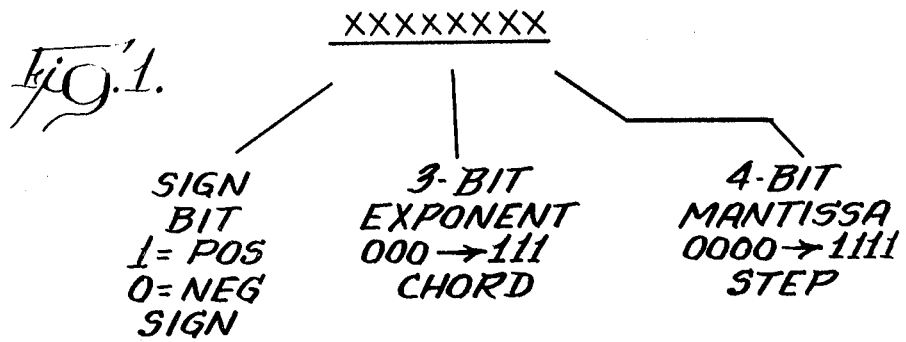
Fig. 1.
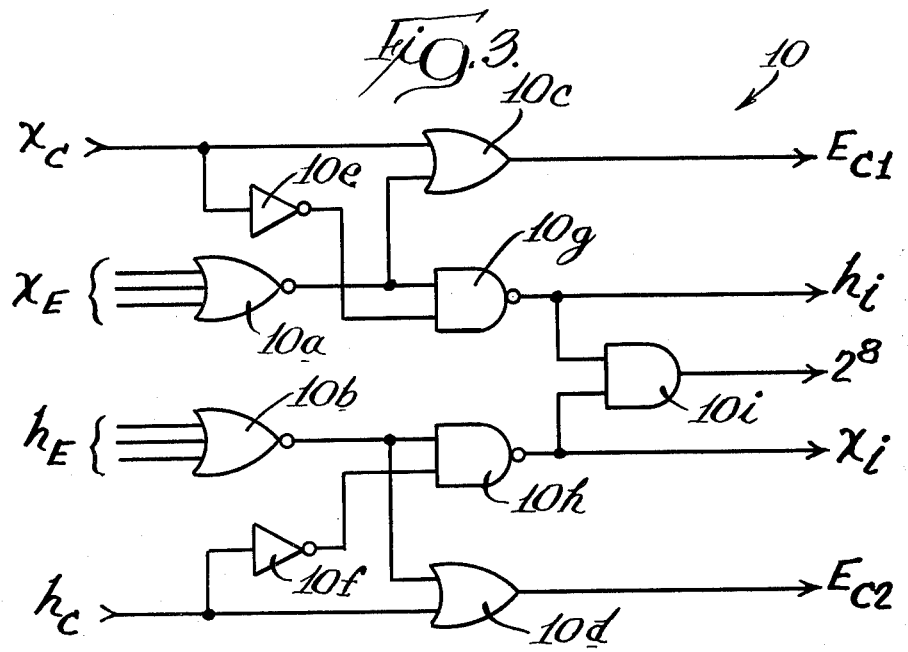
Fig. 3.
Fig. 4.
| CASE | INPUTS | | | | OUTPUTS | | | | | |
|---|---|---|---|---|---|---|---|---|---|---|
| | $X_E$ | $h_E$ | $X_C$ | $h_C$ | $E_{C1}$ | $E_{C2}$ | $X_i$ | $h_i$ | $2^8$ | |
| I | $\neq 0$ | $\neq 0$ | X | X | $X_C$ | $h_C$ | 1 | 1 | 1 | |
| II | $=0$ | $\neq 0$ | X | X | 1 | $h_C$ | 1 | $X_C$ | 0 | |
| III | $\neq 0$ | $=0$ | X | X | $X_C$ | 1 | $h_C$ | 1 | 0 | X = 1 OR 0 |
| IV | $=0$ | $=0$ | X | X | 1 | 1 | $h_C$ | $X_C$ | 0 | |

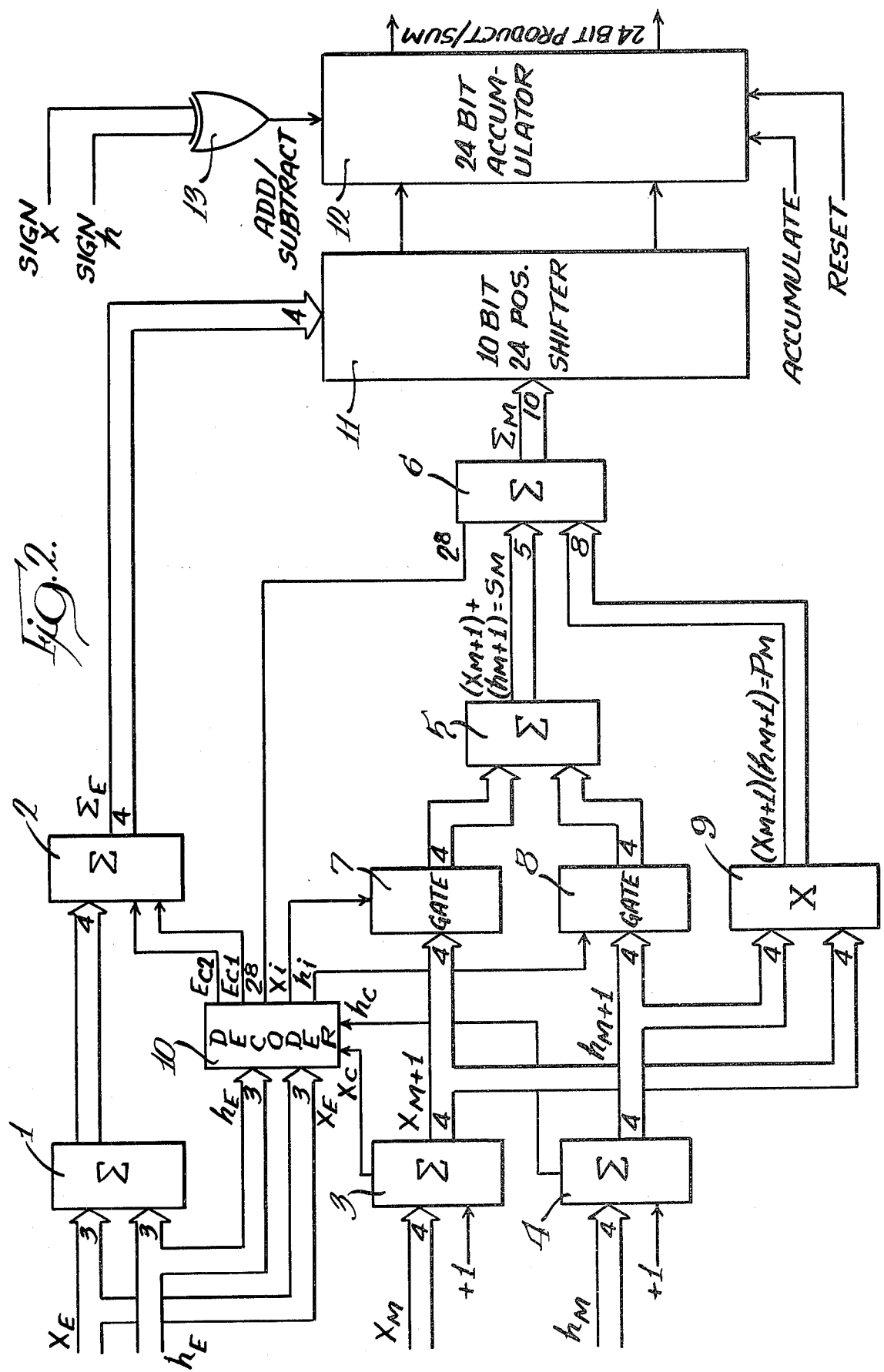

Fig. 5.

| SHIFT CONTROL INPUT $\Sigma_E$ | O$_1$ | O$_2$ | O$_3$ | O$_4$ | O$_5$ | O$_6$ | O$_7$ | O$_8$ | O$_9$ | O$_{10}$ | O$_{11}$ | O$_{12}$ | O$_{13}$ | O$_{14}$ | O$_{15}$ | O$_{16}$ | O$_{17}$ | O$_{18}$ | O$_{19}$ | O$_{20}$ | O$_{21}$ | O$_{22}$ | O$_{23}$ | O$_{24}$ |
|---|---|---|---|---|---|---|---|---|---|---|---|---|---|---|---|---|---|---|---|---|---|---|---|---|
| 0 | D$_1$ | D$_2$ | D$_3$ | D$_4$ | D$_5$ | D$_6$ | D$_7$ | D$_8$ | D$_9$ | D$_{10}$ | | | | | | | | | | | | | | |
| 1 | | D$_1$ | D$_2$ | D$_3$ | D$_4$ | D$_5$ | D$_6$ | D$_7$ | D$_8$ | D$_9$ | D$_{10}$ | | | | | | | | | | | | | |
| 2 | | | D$_1$ | | | | | | | | | D$_{10}$ | | | | | | | | | | | | |
| 3 | | | | D$_1$ | | | | | | | | | D$_{10}$ | | | | | | | | | | | |
| 4 | | | | | D$_1$ | | | | | | | | | D$_{10}$ | | | | | | | | | | |
| 5 | | | | | | D$_1$ | | | | | | | | | D$_{10}$ | | | | | | | | | |
| 6 | | | | | | | D$_1$ | | | | | | | | | D$_{10}$ | | | | | | | | |
| 7 | | | | | | | | D$_1$ | | | | | | | | | D$_{10}$ | | | | | | | |
| 8 | | | | | | | | | D$_1$ | | | | | | | | | D$_{10}$ | | | | | | |
| 9 | | | | | | | | | | D$_1$ | | | | | | | | | D$_{10}$ | | | | | |
| 10 | | | | | | | | | | | D$_1$ | | | | | | | | | D$_{10}$ | | | | |
| 11 | | | | | | | | | | | | D$_1$ | | | | | | | | | D$_{10}$ | | | |
| 12 | | | | | | | | | | | | | D$_1$ | | | | | | | | | D$_{10}$ | | |
| 13 | | | | | | | | | | | | | | D$_1$ | | | | | | | | | D$_{10}$ | |
| 14 | | | | | | | | | | | | | | | D$_1$ | | | | | | | | | D$_{10}$ |

OUTPUTS

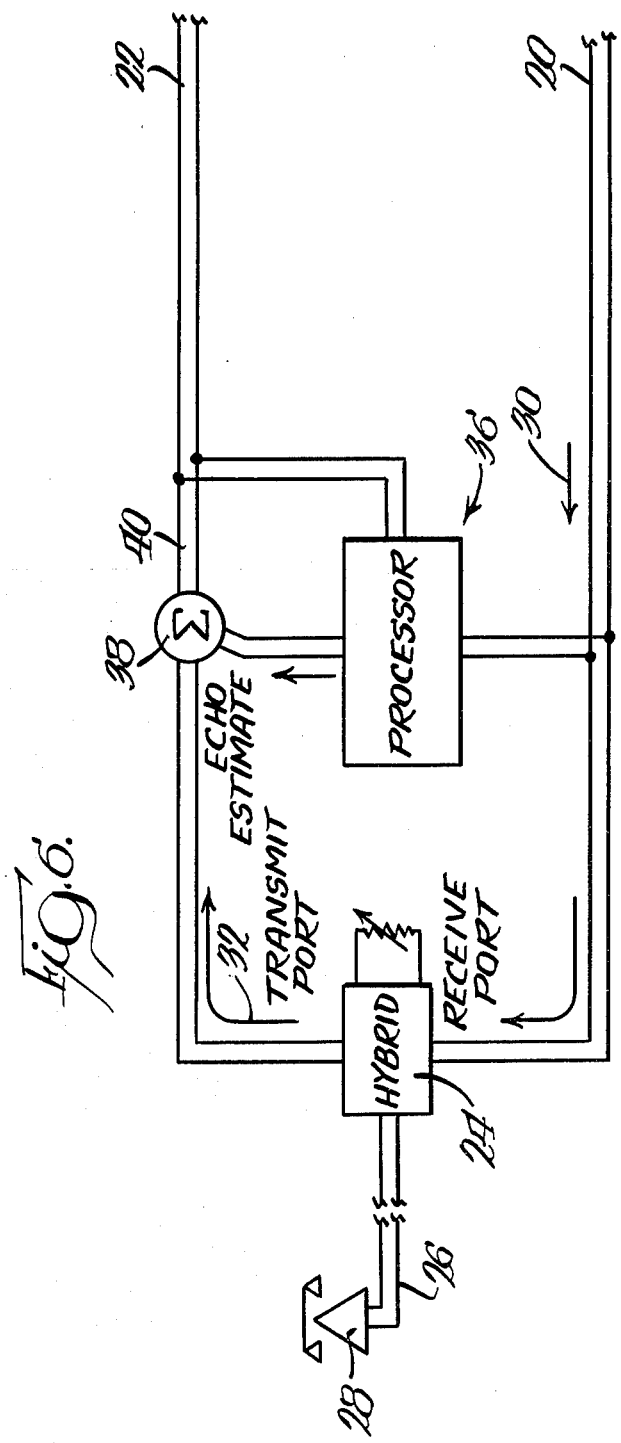

SIGNAL PROCESSOR FOR DIGITAL ECHO CANCELLER

BACKGROUND OF THE INVENTION

The present invention relates to a processor for a digital echo canceller, and in particular to such a processor which generates an echo estimate of an actual echo on an echo path.

Long distance telephone facilities usually comprise four-wire transmission circuits between switching offices in different local exchange areas, and two-wire circuits within each area connecting individual subscribers with the switching office. A call between subscribers in different exchange areas is carried over a two-wire circuit in each of the areas and a four-wire circuit between the areas, with conversion of speech energy between the two and four-wire circuits being effected by hybrid circuits. Ideally, the hybrid circuit input ports perfectly match the impedances of the two and four-wire circuits, and its balance network impedance perfectly matches the impedance of the two-wire circuit, so that signals transmitted from one exchange area to the other will not be reflected or returned to the one area as echo. Unfortunately, due to impedance differences which inherently exist between different two and four-wire circuits, and because impedances must be matched at each frequency in the voice band, it is virtually impossible for a given hybrid circuit to perfectly match the impedances of any particular two and four-wire transmission circuit. Echo is, therefore, characteristically part of a long distance telephone system.

Although undesirable, echo is tolerable in a telephone system so long as the time delay in the echo path is relatively short, for example shorter than 40 milliseconds. However, longer echo delays can be distracting or utterly confusing to a far end speaker, and to reduce the same to a tolerable level an echo canceller may be used toward each end of the path to cancel echo which otherwise would return to the far end speaker. As is known, echo cancellers monitor the signals on the receive channel of a four-wire circuit and generate estimates of the actual echoes expected to return over the transmit channel. The echo estimates are then applied to a subtractor circuit in the transmit channel to remove or at least reduce the actual echo.

In simplest form, generation of an echo estimate comprises obtaining individual samples of the signal on the receive channel, multiplying each sample by the impulse response of the system and then subtracting, at the appropriate time, the resulting products or echo estimates from the actual echo on the transmit channel. As is known, in actual practice generation of an echo estimate is not nearly so straightforward.

Transmission circuits, except those which are purely resistive, exhibit an impulse response which reflects signal frequency and amplitude dispersive characteristics, since phase shift and amplitude attenuation vary with frequency. To this end, a suitable known technique for generating an echo estimate contemplates manipulating representations of a plurality of samples of signals which cause the echo and samples of impulse responses of the system through a convolution process to obtain an echo estimate which reasonably represents the actual echo expected on the echo path. In performing the convolution process with digital echo cancellers, to reduce the complexity and increase the speed of operation and capacity of the circuitry it has been found desirable to encode the signal and impulse response samples in digital A-law format, which is a companding function. For example, an A-law format having an 8-bit output is equivalent to a 12-bit linear code in resolution and has a dynamic encoding range of 62 dB. Such an encoding format is also particularly useful in such applications because of its compatibility with 8-bit microprocessors commonly found in digital echo cancellers.

A unique characteristic of the A-law format is its similarity to binary logarithms. Because of this characteristic, previous approaches to the multiplication of two A-law factors with non-zero exponents have contemplated a direct addition of the two pseudo-logarithmic quantities. Unfortunately, the products of the largest factors, which contribute most to the sum of the products accumulated by the convolution process, contain the largest errors, and although an error correction term is subsequently estimated and added to the result to compensate for the product approximation obtained by the addition of two pseudo-logarithmic quantities, every "multiplication" involving non-zero exponents is nevertheless imprecise. In addition, a typical digital filter or echo cancelling application accomplished by means of a convolution process may require as many as 256 accumulated products, each of which is an approximation as a result of pseudo-logarithmic addition, so that the resulting accumulation may contain as many as 256 "summing" errors prior to any truncation or round-off. In a system such as an adaptive echo canceller where the accumulated product may be used to modify one set of multiplier inputs, decreased stability as well as imprecision results. Consequently, a technique is required for accurate multiplication and accumulation of pairs of A-law factors in order to achieve an acceptable digital filtering process for such applications as echo cancelling and speech synthesizing.

OBJECTS OF THE INVENTION

An object of the present invention is to provide an electronic processor for multiplying two A-law digitally encoded factors in a manner which produces a product which is a precise linear representation of the product of the linear equivalents of the two factors.

Another object of the invention is to provide such a processor for use with a digital echo canceller.

A further object of the invention is to provide such a processor which includes means for accumulating the products of the A-law factors to generate an estimate of an actual echo on an echo path.

SUMMARY OF THE INVENTION

In accordance with the present invention, a system for multiplying first and second multibit factors quantized in conformity with a pseudo-logarithmic compression characteristic, wherein each factor has an exponent and a mantissa, comprises first circuit means for receiving the mantissas and for generating a data signal having a value in accordance with the sum and the product of the mantissas, said first circuit means also generating exponent carry signals as required by the values of the mantissas, and second circuit means for receiving the exponents and said carry signals and for generating a control signal having a value in accordance with the sum thereof. Also included are shifter circuit means for receiving said data and said control signals, said shifter circuit means having a plurality of outputs greater in number than the number of bits in said data signal and generating said data signal at individual ones of said outputs in accordance with the value of said control signal.

The invention also contemplates a method of multiplying first and second multibit factors quantized in conformity with a pseudo-logarithmic compression characteristic. In this case, one factor represents a signal that causes an echo on an echo path of a transmission system, the other the impulse response of the system, and the same are multiplied to generate an echo estimate for subtraction from the echo on the echo path. Each factor has an exponent and a mantissa, and the method comprises the steps of summing signals representation of the sum and of the product of the mantissas to generate a data signal, generating exponent carry signals as required by the values of the mantissas, summing the exponents and said carry signals to generate a control signal, and shifting said data signal by a number of bit places equal to the value of said control signal to generate the product of the factors.

The apparatus and method of the invention are particularly useful in connection with a processor for an echo canceller which generates an estimate of an actual echo on an echo path and applies the same to a subtractor circuit in the path to cancel the echo, the particular manner of multiplying the factors produces a product which is a precise linear representation of the product of the linear equivalents of the factors, and no errors or approximations occur in the multiplication or in generation of the echo estimate.

The foregoing and other objects, advantages and features of the invention will become apparent from a consideration of the following detailed description, when taken in conjunction with the accompanying drawings.

BRIEF DESCRIPTION OF THE DRAWINGS

FIG. 1 illustrates the significance of the various bits of an 8-bit binary number encoded in A-law digital format;

FIG. 2 is a block diagram representation of a processor circuit in accordance with the teachings of the present invention;

FIG. 3 is a schematic circuit drawing of one form of decoder which may be used in the circuit of FIG. 2;

FIG. 4 is a truth table for the circuit of FIG. 3;

FIG. 5 is a tabular representation of the function performed by the 10-bit 24-position shifter of FIG. 2, and FIG. 6 is a block diagram representation of the processor circuit connected with one end of a four-wire to two-wire telephone transmission facility.

DETAILED DESCRIPTION

Long distance telephone systems generally comprise four-wire circuits between central switching offices in different local exchange areas and two-wire circuits within each area connecting individual subscribers with the switching office, with conversion of speech energy between the two and four-wire circuits being effected by hybrid circuits. As is conventional, one pair of wires in the four-wire circuit carries signals from one subscriber to the other and the other pair carries signals from the other subscriber to the one, and for either subscriber the pair of wires at his end of the circuit over which he receives voice signals is considered as comprising a receive channel and the pair over which his voice signals are transmitted is called a transmit channel. Ideally, the hybrid circuit port impedances perfectly match the impedances of the two and the four-wire circuits, and the hybrid circuit balance network perfectly matches the impedance of the two-wire circuit, so that signals on the receive channel are not reflected to or returned over the transmit channel as echo. However, due to impedance differences which inherently exist between two and four-wire circuits, and since impedances must be matched at each frequency in the voice band, it is virtually impossible for a hybrid circuit to perfectly match any particular transmission circuit. Echo is, therefore, inherent in long distance telephone systems.

To deal with echo created when a portion of the signal on the receive channel is transferred to the transmit channel, digital echo cancellers are often used toward each end of a four-wire circuit. Echo cancellation is a method of echo control wherein an echo estimate is computed and then subtracted from an actual echo signal. To this end, the echo canceller samples signals on the receive and transmit channels and generates and applies to a subtractor circuit in the transmit channel an echo estimate, which is the echo expected to occur on the transmit channel in response to receive channel signals. The subtractor then removes the value of the echo estimate from the signal on the transmit channel.

Echo signals on the transmit channel are affected by the impulse response of the system. Since a telephone circuit is not purely resistive its impulse response is not constant, but instead reflects signal frequency and amplitude dispersive characteristics. Consequently, echo cancellers often include processor means for accumulating samples of signals on the receive and transmit channels and for manipulating the same by means of a convolution process to generate echo estimates for application to the subtractor. As is known, a convolution process in which individual receive channel signal samples are multiplied by echo path impulse responses, and a plurality of the products summed, generates a relatively accurate estimate of the actual echo on the transmit channel.

To obtain reasonable accuracy in conversion of a wide range of receive channel signal and echo path impulse response samples from analog to digital form, to limit the complexity of circuitry required for processing the same and to afford compatibility with 8-bit microprocessors, conventional echo cancellers sometimes use an A-law encoding format having a digital 8-bit output which is equivalent to a 12-bit linear code in resolution and has a dynamic encoding range of 62 dB. A unique characteristic of the A-law format is its similarity to binary logarithms, and because of this similarity previous approaches to multiplying two A-law factors have been based on a direct addition of the two A-law pseudo-logarithmic factors whenever the exponents of the same were non-zero. A problem encountered with this approach is that the products of the largest factors, which contribute most to the sum of the accumulated products, contain the largest errors, and although the prior art contemplates estimating an error correction term and adding the same to the accumulated products to compensate for the approximation in their generation, every "multiplication" nevertheless is imprecise. In this connection, a typical digital filter application accomplished by means of a convolution process may require the accumulation of as many as 256 products, each of which is an approximation as a result of pseudo-logarithmic additions. Consequently, the resulting accumulation may contain as many as 256 "summing" errors. In systems such as adaptive echo cancellers, where accumulated products often modify one set of inputs, decreased stability as well as imprecision results.

In overcoming the disadvantages of the prior art, the present invention provides a processor for a digital echo canceller, which multiplies two A-law encoded factors in a manner which produces a product that is a precise linear representation of the product that would be obtained if the linear equivalents of the two A-law factors were multiplied, and then accumulates or sums a plurality of the products to generate an echo estimate. No errors or approximations occur in the process, which enhances the performance and stability of adaptive echo canceller systems.

FIG. 1 shows the significance of the various bits of an 8-bit binary number encoded in A-law format, an 8-bit factor encoding range having been selected for the purpose of describing the present invention. The last four bits to the right represent the mantissa of the factor, and therefore the step value from 0 to 15. The three bits occupying the second through fourth positions represent the exponent of the factor, and therefore the chord value from 0 to 7, and the first bit indicates the sign of the factor. Thus, 256 different values may be represented by the 8-bit binary number encoded in A-law format. Obviously, depending on system requirements an encoding range having more or less chords and steps may be used.

As is known, the linear encoding equivalent for an A-law quantity is:

$$I_{cs} = 2^c (s+17)$$

where
 c = A-law chord value ($1 \leq c \leq 7$),
 s = A-law step value ($0 \leq s \leq 15$), and
 $I_{cs}$ = decimal equivalent ($2 \leq I_{cs} \leq 4096$)
for an encoding range having 7 chords and 15 steps. Consequently, the linear encoding equivalent for the product of two A-law numbers is $$I_{cs1}I_{cs2} = 2^{c1+c2}[(s_1+1)(s_2+1)+2^4[(s_1+1)+(s_2+1)]+2^8].$$

As earlier discussed, relatively accurate echo estimates are obtained by multiplying individual receive channel signal samples by individual transmit channel impulse response samples and summing a plurality of the products. If the decimal equivalent value of the receive channel signal sample is designated x and of the echo path impulse response sample is designated h, and if a substitution is made in the above equation so that
 $x = I_{cs1}$: first decimal equivalent factor
 $h = I_{cs2}$: second decimal equivalent factor
 $x_e = c_1$: exponent or A-law chord value of 1st factor
 $x_m = s_1$: mantissa or A-law step value of 1st factor
 $h_e = c_2$: exponent or A-law chord value of 2nd factor
 $h_m = s_2$: mantissa or A-step value of 2nd factor
then the product of x and h may be expressed as $$xh = 2^{x_e+h_e}[(x_m+1)(h_m+1)+2^4[(x_m+1)+(h_m+1)]+2^8] \quad (1)$$

for case I where
 $1 \leq x_e \leq 7$
 $1 \leq h_e \leq 7$
 $0 \leq x_m \leq 15$
 $0 \leq h_m \leq 15$.

Equation (1) is the algorithm implemented for non-zero exponents of both x and h. Should one of the exponents be zero, then the product becomes $$xh = 2^{h_e+1}[(x_m+1)(h_m+1)+2^4(x_m+1)] \quad (2)$$

for case II where
 $x_e = 0$
 $1 \leq h_e \leq 7$
 $0 \leq x_m \leq 14$
 $0 \leq h_m \leq 15$
and $$xh = 2^{x_e+1}[(x_m+1)(h_m+1)+2^4(h_m+1)] \quad (3)$$

for case III where
 $h_e = 0$
 $1 \leq x_e \leq 7$
 $0 \leq x_m \leq 15$
 $0 \leq h_m \leq 14$.

Should both $x_e$ and $h_e$ be zero, then the product of x and h is $$xh = 2^2(x_m+1)(h_m+1) \quad (4)$$

for case IV where
 $x_e = 0$
 $h_e = 0$
 $0 \leq x_m \leq 14$
 $0 \leq h_m \leq 14$ Note that if in equation (2) $x_m$ equals 15, then ($x_m+1$) equals 0, $x_e$ equals 1 and equation (1) becomes applicable. If in equation (3) $h_m$ is 15, then ($h_m+1$) becomes 0, $h_e$ is 1 and equation (1) prevails. Similarly, if in equation (4) $x_m$ is 15, then equation (3) applies, if $h_m$ is 15, equation (2) applies, and if both $x_m$ and $h_m$ are 15, then equation (1) applies.

With x and h each representing 1 out of 256 possible decimal values of an 8-bit A-law encoded quantity, the circuit of the invention as shown in FIG. 2 generates individual linear products of the same in accordance with a selected one of equations (1)–(4), and sums pluralities of the products to generate echo estimates for application to a subtractor circuit in a transmit channel. For the purpose of reference, numbers shown within component interconnection channels represent the number of binary bits carried by the channels, and the connections between components are labeled with the nature of information carried thereby.

More particularly, the circuit of FIG. 2 includes a plurality of binary adder circuits 1, 2, 3, 4, 5 and 6 which generate at their outputs summations of binary signals at their inputs, and a pair of logic gates 7 and 8 which pass binary inputs to their outputs whenever a respective enable input $x_i$ and $h_i$ is active (logic level 1), with their outputs otherwise being 0. A multiplier circuit 9 multiplies a pair of 4-bit signals at its inputs to generate an 8-bit product at its output, and a decoder 10 controls operation of the gates 7 and 8 and of the adders 2 and 6 in accordance with the values of the factors x and h so that the circuitry manipulates the factors in accordance with a particular one of the equations (1)–(4). FIG. 3 illustrates one possible embodiment of the decoder circuit 10, which as shown includes a pair of NOR gates 10a and 10b, a pair of OR gates 10c and 10d, a pair of inverting amplifiers 10e and 10f, a pair of NAND gates 10g and 10h and an AND gate 10i. FIG. 4 is a truth table for operation of the decoder.

The outputs from the binary adders 2 and 6 are applied as inputs to a 10-bit 24-position shifter circuit 11 which has ten data inputs for receiving the output from the adder 6, four shift control inputs for receiving the output from the adder 2, and twenty-four data outputs. In operation of the shifter circuit, as shown in FIG. 5 the ten data bits from the adder 6 are shifted to a selected ten of the twenty-four outputs in accordance with the value of the shift control input from the adder 2, the remaining outputs then being zero.

The shifter circuit outputs are applied to associated inputs to a 24-bit binary accumulator circuit 12, which stores and generates at its outputs the sum of a plurality of counts, for example 256 counts. In operation, in response to an accumulate command the binary quantity at the input to the accumulator is shifted therein, the oldest quantity is shifted out, and the accumulator then generates at its outputs the sum of the then stored quantities for application, for example, to a subtractor circuit in a transmit channel in the case where the processor is used in an echo canceller. To control whether the accumulator adds or subtracts the count at its input from the stored count, or whether the count at its input is positive or negative for summation purposes, the sign bits of x and h are applied to an exclusive OR gate 13, the output from which is applied to an add/subtract control input to the accumulator.

Binary A-law encoding of the linear factors x and h may be accomplished by any suitable transmit and receive channel signal sampling and A-law encoding circuitry of a type known in the art. For case I where the exponents $x_e$ and $h_e$ are each non-zero, the decoder 10 causes the circuit to implement equation (1). In this connection, the mantissas $x_m$ and $h_m$ enter the binary adders 3 and 4, respectively, wherein each is incremented by $+1$ to form the $(x_m+1)$ and $(h_m+1)$ quantities of equation (1) at the adder outputs. These quantities are applied as inputs both to the multiplier circuit 9 which generates the product $P_m = (x_m+1)(h_m+1)$ to satisfy the first bracketed term of the quation, and to the binary adder circuit 5 through the gates 7 and 8, since from FIG. 4 it is seen that for two non-zero exponents the decoder $x_i$ and $h_i$ outputs are each at an active logic level 1 to enable the gates. The binary adder 5 generates at its output the $S_m = [(x_m+1)+(h_m+1)]$ portion of the second term of the algorithm.

The outputs from the binary adder 5 and the multiplier 9 are applied to the binary adder 6. From FIG. 4 it is seen that for non-zero values of the exponents the $2^8$ output from the decoder circuit 10 is active and applied as an input to the binary adder 6 to form the third term of the equation. The three terms are summed by the binary adder in such a manner that $2^4$ weighting of the second term and $2^8$ weighting of the third term are introduced into the resulting summation. Since all of the included terms are linear the sum is linear, equals $\Sigma_m = (P_m + 2^4 S_m + 2^8)$, and is applied as an input to the shifter circuit 11 wherein it is scaled by the $2^{x_e + h_e}$ term of the algorithm.

The exponent portions of $x_e$ and $h_e$ control scaling of the mantissa terms in the shifter circuit 11, and to this end are applied to both the binary adder 1 wherein they are summed to form $(x_e + h_e)$, and to the decoder circuit 10 to generate output signals therefrom as per FIG. 4.

The output from the adder 1 is applied as an input to the adder 2, which also receives as inputs the carry signals $E_{c1}$ and $E_{c2}$ from the decoder. For case I the signals $E_{c1}$ and $E_{c2}$ equal the carry signals $x_c$ and $h_c$, respectively, from the binary adders 3 and 4, so that the exponent summation is incremented by $x_c$ and/or $h_c$ in response to $(x_m + 1)$ and/or $(h_m + 1)$ equaling 0, i.e., whenever the mantissas equal the maximum step value for the range of A-law encoding used. The adder 2 sums the values of the signals at its inputs and generates the signal $\Sigma_e$ for application to the shift control inputs to the shifter 11 to scale the mantissa term by shifting the same along the shifter outputs by $\Sigma_e$ places. A linear product which precisely represents that which would be obtained by multiplying the linear factors x and h now appears at the input to the accumulator circuit 12 and is added to or subtracted from the count therein, in response to a command signal on the accumulate input, in accordance with the polarity of x and h as applied to the exclusive OR gate 13.

When the exponent $x_e$ is zero, the decoder 10 causes the circuit to execute equation (2). In this case, the mantissas $x_m$ and $h_m$ enter the binary adders 3 and 4 where each is incremented by $+1$ to form the $(x_m+1)$ and $(h_m+1)$ quantities. The $(x_m+1)$ quantity is passed through the gate 7, but the $(h_m+1)$ quantity is blocked from passage through the gate 8 since at this time, and for as long as $x_m$ is less than 15 so that the carry term $x_c$ does not equal 1, the signal $h_i$ is inactive, the gate 8 is inhibited and the output from the adder circuit 5 is $S_m = (x_m + 1)$. Also at this time the $2^8$ output from the decoder 10 is 0, so that the output from the adder 6 is $\Sigma_m = P_m + 2^4 S_m = [(x_m+1)(h_m+1) + 2^4(x_m+1)]$, where $2^4$ weighting is included in the summation by adding the 4-bit $S_m$ term to the four most significant bits of the 8-bit $P_m$ term. $\Sigma_m$ then enters the shifter circuit 11 where it is scaled by the $2^{h_e+1}$ term.

Relative to the exponents $x_e$ and $h_e$, the same enter the binary adder 1 where, since $x_e$ is zero, the output is $h_e$. They also enter the decoding circuit 10 where, as shown in FIG. 4, the $2^8$ output becomes 0, $h_i$ equals $x_c$ and $E_{c1}$ is 1. $E_{c1}$ is added to $h_e$ by the binary adder 2 to form $\Sigma_e = (h_e + 1)$, which is applied to the shifter 11 to cause the mantissa sum $\Sigma_m$ to be shifted by $(h_e + 1)$ places for input to the accumulator 12.

It should be noted that a special condition exists if the mantissa $x_m$ has a value of 15 when the exponent $x_e$ is zero. In this case, the addition $(x_m + 1)$ performed by the binary adder 3 equals 0 and a carry term $x_c = 1$ is effected into the $x_e$ term. This causes equation (1) to be executed with $(x_m + 1) = 0$ and $x_e = 1$.

If the exponent $h_e$ is zero, case III or equation (3) is executed. To this end, the mantissas $x_m$ and $h_m$ enter the binary adders 3 and 4 wherein each is incremented by $+1$ to form the $(x_m + 1)$ and the $(h_m + 1)$ quantities. These quantities are input to the multiplier circuit 9 which forms the product $P_m$, and the $(h_m + 1)$ quantity also passes through the gate 8. However, the $(x_m + 1)$ quantity is blocked from passage through the gate 7 because at this time, as shown in FIG. 4, the signal $x_i$ is inactive. Thus, the output from the binary adder circuit 5 is $S_m = (h_m + 1)$, the $2^8$ output from the decoder 10 is 0 and the output from the adder circuit 6 is $\Sigma_m = [(x_m+1)(h_m+1) + 2^4(h_m+1)]$, where $2^4$ weighting is included in the summation by adding the 4-bit $S_m$ term to the four most significant bits of the $P_m$ term. The output from the adder 6 then enters the shifter circuit 11 for scaling by the $2^{x_e + 1}$ term.

At the same time, the exponents $x_e$ and $h_e$ enter the binary adder 1 where, since $h_e$ is zero, the output is $x_e$. The exponents also enter the decoding circuit 10 where, as seen from FIG. 4, the $2^8$ output is 0, $x_i$ equals $h_c$ and $E_{c2}$ is 1. The $E_{c2}$ output from the decoder is added to $x_e$ in the binary adder 2 to form $\Sigma_e = x_e + 1$, which is applied to the shifter circuit 11 to cause $\Sigma_m$ to be shifted by $\Sigma_e$ places for application to the accumulator 12.

Similar to the situation that exists in execution of equation (2), should the mantissa $h_m$ be 15 when the exponent $h_e$ is 0, the addition $(h_m + 1)$ equals 0 and a carry $h_c = 1$ is effected into the $h_e$ term. In this event equation (1) is executed.

The remaining mode of operation of the circuit of FIG. 2 occurs when both of the exponents $x_e$ and $h_e$ are zero, in which case equation (4) is executed. As before, the mantissas $x_m$ and $h_m$ enter the binary adders 3 and 4 wherein each is incremented by +1 to generate the $(x_m + 1)$ and $(h_m + 1)$ quantities for application to the multiplier 9. The quantities, however, are blocked from passing through the gates 7 and 8 because the signals $x_i$ and $h_i$ are each inactive at this time, and remain inactive for as long as neither $h_c$ nor $x_c$ equals 1. The output of the binary adder 5 is therefore 0, and as may be seen from FIG. 4 the $2^8$ output from the decoder 10 is also 0. Consequently, the output from the adder 6 is $\Sigma_m = P_m = (x_m + 1)(h_m 1)$, which enters the shifter 11 for scaling by the $2^2$ term, since in this case $E_{c1}$ and $E_{c2}$ each equal 1 and are summed by the adder 2. The output from the shifter is then input to the accumulator circuit 12.

Three special cases may occur in the situation where the exponents $x_e$ and $h_e$ are each zero. If the mantissa $x_m$ has the maximum value of 15, then $(x_m + 1)$ equals 0 and the carry term $x_c$ is effected into the exponent $x_e$. In this event equation (3) is executed. Should the mantissa $h_m$ have a value of 15, then $(h_m + 1)$ equals 0, the carry term $h_c$ is effected into the exponent $h_e$ and equation (2) is executed. If both of the mantissas $x_m$ and $h_m$ are 15, then both $(x_m + 1)$ and $(h_m + 1)$ are 0 and the carry terms $x_c$ and $h_c$ are effected into the exponents $x_e$ and $h_e$, respectively, so that equation (1) is executed.

FIG. 6 diagrammatically illustrates in simplified form one intended use of the processor of the invention. The drawing depicts a near end of a long distance telephone facility, which includes a four-wire circuit comprising a receive channel 20 and a transmit channel 22 connected through a hybrid circuit 24 with a two-wire circuit 26 leading to a telephone set 28 of a near end subscriber. As is understood, the receive channel carries a far end subscriber's voice signal, indicated by the arrow 30, to the hybrid circuit for connection with the near end subscriber over the two-wire circuit. The hybrid circuit also connects the near end subscriber's voice signals with the transmit channel, as indicated by the arrow 32, for transmission to the far end subscriber.

To decrease echo signals coupled by the hybrid circuit 24 from the receive channel to the transmit channel, the signal processor to the invention, indicated generally at 36, may be connected at inputs thereto with the signals on the receive and transmit channels and at an output with a summation circuit 38 in the transmit channel. The processor samples the signals on the receive and transmit channels and generates at its output (i.e., at the outputs from the 24-bit accumulator 12) an estimate of the echo on the transmit channel. The echo estimate is then reversed in polarity and applied to the summation circuit, which adds the negative echo estimate to the actual echo so that only a residual echo, if any, remains on the transmit channel.

The invention thus provides an improved convolution processor particularly adapted for use in echo cancelling or speech synthesizing applications. The processor precisely convolves digital signals, has minimum complexity and numbers of components, and enables two A-law digitally encoded factors to be multiplied to produce a product which is a precise linear representation of that which would be obtained by a multiplication of the linear equivalents of the factors. It is understood, of course, that while the invention has been described in connection with convolving A-law encoded factors, it is within the contemplation of the invention that similar manipulations may be performed with other factor encoding formats.

While embodiments of the invention have been described in detail, various modifications and other embodiments thereof may be devised by one skilled in the art without departing from the spirit and scope of the invention, as defined in the appended claims.

What is claimed is:

1. A system for multiplying first and second multibit factors quantized in conformity with a pseudo-logarithmic compression characteristic, wherein each factor has an exponent and a mantissa, comprising first circuit means for receiving the mantissas and for generating a data signal having a value in accordance with the sum and the product of the mantissas, said first circuit means also generating exponent carry signals as required by the values of the mantissas; second circuit means for receiving the exponents and said carry signals and for generating a control signal having a value in accordance with the sum thereof; and shifter circuit means for receiving said data and said control signals, said shifter circuit means having a plurality of outputs greater in number than the number of bits in said data signal and generating said data signal at individual ones of said outputs in accordance with the value of said control signal.

2. A system as in claim 1, each said shifter circuit output representing a separate binary bit position and said data signal having n bits, said shifter circuit generating said data signal at its first n outputs upon occurrence of a zero value of said control signal and shifting said data signal bits as a group along x of its outputs in response to a control signal value of x.

3. A system as in claim 1, wherein said system is for multiplying pluralities of pairs of first and second factors, including accumulator circuit means connected to receive said shifter circuit means output signals, said accumulator circuit means generating a summation of a plurality of output signals from said shifter circuit means.

4. A system as in claim 3, wherein the first and second factors each have a sign bit, including third circuit means for comparing the sign bits of the factors of each pair, said third circuit means being connected with said accumulator circuit to control the same to add or subtract each shifter circuit output signal from the summation therein in accordance with the sign bits being like or unlike, respectively.

5. A system for multiplying first and second A-law encoded binary factors, the first factor having an exponent $x_e$, a mantissa $x_m$ and a sign bit and the second factor having an exponent $h_e$, a mantissa $h_m$ and a sign bit, comprising first circuit means for receiving the mantissas at inputs thereto and for generating at outputs therefrom the quantities $(x_m+1)$ and $(h_m+1)$ and active carry bits $x_c$ and $h_c$ whenever the respective quantity equals zero, which occurs whenever the respective mantissa equals the maximum step value for the range of A-law encoding used; multiplier circuit means for receiving said quantities and for multiplying the same to generate a product signal $P_m$; second circuit means for receiving said quantities and controllable to generate an output signal $S_m$ which equals either zero, one of said quantities or a summation of both of said quantities; a first adder circuit for generating at an output therefrom a summation $\Sigma_m$ of signals at inputs thereto, said first adder circuit receiving at its inputs said signals $P_m$ and $S_m$, and one of said adder circuit and said second circuit means providing $2^4$ weighting for said signal $S_m$ in said summation signal $\Sigma_m$; a second adder circuit for generating at an output therefrom a summation signal $\Sigma_e$ of signals at inputs thereto, said second adder circuit receiving at its inputs the exponents $x_e$ and $h_e$; a decoder circuit for receiving the exponents $x_e$ and $h_e$ and said carry signals $x_c$ and $h_c$, said decoder circuit having outputs which are selectively rendered active in accordance with the values of $x_e$, $h_e$, $x_c$ and $h_c$, wherein two of said outputs $E_{c1}$ and $E_{c2}$ are applied to inputs to said second adder circuit, another two of said outputs $x_i$ and $h_i$ are applied to said second circuit means to control the same, and one output $2^8$ is applied to one of said second circuit means and said first adder circuit to cause the introduction, when said output is active, of $2^8$ into said signal $\Sigma_m$; and shifter circuit means having data inputs for receiving said first adder circuit output signal $\Sigma_m$ and shift control inputs for receiving said second adder circuit output signal $\Sigma_e$, said shifter circuit having a plurality of outputs greater in number than the number of bits in said signal $\Sigma_m$ and generating said signal $\Sigma_m$ at selected ones of said outputs in accordance with the value of said signal $\Sigma_e$.

6. A system as in claim 5, wherein said system is for multiplying pluralities of pairs of first and second factors, including an accumulator circuit for receiving said shifter circuit means output signal, said accumulator circuit generating a summation of a plurality of output signals from said shifter circuit.

7. A system as in claim 6, including a comparator circuit for comparing the sign bits of each pair of factors and connected with said accumulator circuit to control the same to add or subtract the value of said shifter circuit output signal to or from the summation therein in accordance with the sign bits being like or unlike, respectively.

8. A system as in claim 5, wherein said decoder circuit outputs $x_i$, $h_i$ and $2^8$ are active to control said second circuit means so that said signal $S_m$ equals the sum of said quantities $(x_m+1)$ and $(h_m+1)$ and so that $2^8$ is introduced into said signal $\Sigma_m$, and said decoder circuit outputs $E_{c1}$ and $E_{c2}$ are active to increment said signal $\Sigma_e$ in response to said carry bits $x_c$ and $h_c$, respectively, being active, whenever neither of the exponents $x_e$ and $h_e$ equals zero.

9. A system as in claim 5, wherein said decoder circuit outputs $E_{c1}$ and $x_i$ are active, said outputs $h_i$ and $2^8$ are inactive, and said output $E_{c2}$ is active in response to said carry bit $h_c$ being active, whenever the exponent $x_e$ equals zero, the exponent $h_e$ does not equal zero and the mantissa $x_m$ is less than the maximum step value, so that said second circuit means is controlled so that said signal $S_m$ equals said quantity $(x_m+1)$, $2^8$ is not introduced into said signal $\Sigma_m$ and said signal $\Sigma_e$ is incremented by said decoder circuit output $E_{c1}$, as well as by said output $E_{c2}$ if said output is active.

10. A system as in claim 5, wherein said decoder circuit outputs $E_{c2}$ and $h_i$ are active, said outputs $x_i$ and $2^8$ are inactive, and said output $E_{c1}$ is active in response to said carry bit $x_c$ being active, whenever the exponent $h_e$ equals zero, the exponent $x_e$ does not equal zero and the mantissa $h_m$ is less than the maximum step value, so that said second circuit means is controlled so that said signal $S_m$ equals said quantity $(h_m+1)$, $2^8$ is not introduced into said signal $\Sigma_m$ and said signal $\Sigma_e$ is incremented by said decoder output $E_{c2}$, as well as by said output $E_{c1}$ if said output is active.

11. A system as in claim 5, wherein said decoder circuit outputs $E_{c1}$ and $E_{c2}$ are active and said outputs $x_i$, $h_i$ and $2^8$ are inactive whenever both of the exponents $x_e$ and $h_e$ equal zero and each of the mantissas $x_m$ and $h_m$ is less than the maximum step value, so that said second circuit means is controlled so that said signal $S_m$ equals zero, $2^8$ is not introduced into said signal $\Sigma_m$ and said signal $\Sigma_e$ is incremented by both of said decoder outputs $E_{c1}$ and $E_{c2}$.

12. A system as in claim 5, said second circuit means comprising first gate means having an input for receiving said quantity $(x_m+1)$, an enable input for receiving said decoder means output $x_i$, and an output, second gate means having an input for receiving said quantity $(h_m+1)$, an enable input for receiving said decoder means output $h_i$ and an output, each said gate means generating at its output the signal at its input whenever the respective carry signal at its enable input is active, and a third binary adder circuit for receiving said gate means outputs and for generating at an output therefrom said signal $S_m$.

13. A system for multiplying first and second A-law encoded binary factors wherein the first factor has a non-zero exponent $x_e$, a mantissa $x_m$ and a sign bit and the second factor has a non-zero exponent $h_e$, a mantissa $h_m$ and a sign bit, comprising first circuit means for receiving the mantissas at inputs thereto and for generating at outputs therefrom the quantities $(x_m+1)$ and $(h_m+1)$ and active carry bits $x_c$ and $h_c$ whenever the respective quantity equals zero, which occurs whenever the respective mantissa equals the maximum step value for the range of A-law encoding used; multiplier circuit means for receiving said quantities and for multiplying the same to generate a product signal $P_m$; a first binary adder circuit for receiving said quantities and for generating a summation signal $S_m$ of the same; a second binary adder circuit for generating at an output therefrom a summation signal $\Sigma_m$ of signals at inputs thereto, said second binary adder receiving said signals $P_m$ and $S_m$ at inputs thereto and one of said first and second binary adder circuits providing $2^4$ weighting for said signal $S_m$ in said signal $\Sigma_m$; means for applying a $2^8$ input signal to an input to one of said first and second binary adder circuits so that said signal $\Sigma_m$ equals $(P_m+2^4S_m+2^8)$; a third binary adder circuit for receiving at inputs thereto the exponents $x_e$ and $h_e$ and signals representative of said carry bits $x_c$ and $h_c$ and for generating at an output therefrom a summation signal $\Sigma_e$ which equals the sum of the exponents plus one $(+1)$ for each active carry bit; and shifter circuit means having data inputs for receiving said signal $\Sigma_m$ and shift control inputs for receiving said signal $\Sigma_e$, said shifter circuit having a plurality of outputs greater in number than the number of bits in said signal $\Sigma_m$ and generating said signal $\Sigma_m$ at selected ones of its outputs in accordance with the value of said signal $\Sigma_e$.

14. A system as in claim 13, wherein said system is for multiplying pluralities of pairs of first and second factors, including an accumulator circuit for receiving said shifter circuit means output signals and for generating a summation of a plurality of said signals, and a comparator circuit for comparing the sign bits of each pair of factors and connected with said accumulator circuit for controlling the same to add or subtract the value of said shifter circuit output signal to or from the summation therein in accordance with the sign bits being like or unlike, respectively.

15. A system for multiplying first and second A-law encoded binary factors wherein the first factor has an exponent $x_e$ equal to zero, a mantissa $x_m$ having a value less than the maximum step value for the range of A-law encoding used and a sign bit, and the second factor has a non-zero exponent $h_e$, a mantissa $h_m$ and a sign bit, comprising first circuit means for receiving the mantissa at inputs thereto and for generating at outputs therefrom the quantities $(x_m+1)$ and $(h_m+1)$ and an active carry bit $h_c$ whenever the quantity $(h_m+1)$ equals zero, which occurs whenever the mantissa $h_m$ has the maximum step value; multiplier circuit means for receiving said quantities and for multiplying the same to generate a product signal $P_m$; a first binary adder circuit for receiving at inputs thereto said quantity $(x_m+1)$ and said signal $P_m$, said binary adder circuit providing $2^4$ weighting for said quantity $(x_m+1)$ and generating at an output therefrom a summation signal $\Sigma_m$ equal to $[P_m+2^4(x_m+1)]$; second circuit means for receiving the exponent $h_e$ and said carry bit $h_c$ at inputs thereto and for generating an output signal $\Sigma_e$ equal to $(h_e+1)$ if the carry bit $h_c$ is inactive or $(h_e+2)$ if the carry bit $h_c$ is active; and shifter circuit means having data inputs for receiving said signal $\Sigma_m$ and shift control inputs for receiving said signal $\Sigma_e$, said shifter circuit having a plurality of outputs greater in number than the number of bits in said signal $\Sigma_m$ and generating said signal $\Sigma_m$ at selected ones of its outputs in accordance with the value of said signal $\Sigma_e$.

16. A system as in claim 15, wherein said system is for multiplying pluralities of pairs of first and second factors, including an accumulator circuit for receiving said shifter circuit means output signals and for generating a summation of a plurality of said signals, and a comparator circuit for comparing the sign bits of each pair of factors and connected with said accumulator circuit for controlling the same to add or subtract the value of each said shifter circuit output signal to or from the summation therein in accordance with the sign bits being like or unlike, respectively.

17. A system for multiplying first and second A-law encoded binary factors wherein the factors have exponents equal to zero, respective mantissas $x_m$ and $h_m$ each having a value less than the maximum step value for the range of A-law encoding used and sign bits, comprising first circuit means for receiving the mantissas $x_m$ and $h_m$, for generating the quantities $(x_m+1)$ and $(h_m+1)$, and for multiplying said quantities to generate a product signal $P_m$; shifter circuit means having data inputs for receiving said signal $P_m$ and a shift control input, said shifter circuit having a plurality of outputs greater in number than the number of bits in said signal $P_m$ and generating said signal $P_m$ at selected ones of its outputs as determined by the value of the signal at its shift control input; and means for applying a signal to said shift control inputs to operate said shifter circuit to shift said signal $P_m$ two places along its outputs.

18. A system as in claim 17, wherein said system is for multiplying pluralities of pairs of first and second factors, including an accumulator circuit for receiving said shifter circuit means output signals and for generating at an output therefrom a summation of a plurality of said signals, and a comparator circuit for comparing the sign bits of each pair of factors and connected with said accumulator circuit for controlling the same to add or subtract the value of each said shifter circuit output signal to or from the summation therein in accordance with the sign bits being like or unlike, respectively.

19. A method of multiplying first and second multibit factors quantized in conformity with a pseudologarithmic compression characteristic, wherein one factor represents a signal that causes an echo on an echo path of a transmission system and the other the impulse response of the system, in order to generate an echo estimate for subtraction from the echo on the echo path, and wherein each factor has an exponent and a mantissa, comprising the steps of summing signals representative of the sum and of the product of the mantissas to generate a data signal; generating exponent carry signals as required by the values of the mantissas; summing the exponents and said carry signals to generate a control signal; and shifting said data signal by a number of bit places equal to the value of said control signal to generate the product of the factor.

20. A method as in claim 19, wherein pluralities of pairs of factors are multiplied, including the step of summing a plurality of products of the factors.

21. A method as in claim 20, wherein the first and second factors each have a sign bit, including the steps of comparing the sign bits of the factors of each pair, and controlling the step of summing a plurality of factor products to add or subtract each product to or from the summation in accordance with the sign bits being like or unlike, respectively.

22. A method as in claim 21, including the step of subtracting the summation of the plurality of factor products from the echo signal on the echo path.

23. A method of multiplying first and second A-law encoded binary factors, wherein one factor represents a signal that causes an echo on an echo path for a transmission system and the other the impulse response of the system, in order to generate an echo estimate for subtraction from the echo on the echo path, and wherein the first factor has a non-zero exponent $x_e$, a mantissa $x_m$ and a sign bit and the second factor a non-zero exponent $h_e$, a mantissa $h_m$ and a sign bit, comprising the steps of incrementing each of the mantissas to generate the quantities $(x_m+1)$ and $(h_m+1)$; generating a carry bit $x_c$ and $h_c$ whenever a respective quantity $(x_m+1)$ and $(h_m+1)$ equals zero, which occurs whenever the respective mantissa equals the maximum step value for the range of A-law encoding used; multiplying said quantities to generate a product $P_m$ thereof; adding said quantities to generate a summation $S_m$ of the same; weighting said summation $S_m$ by $2^4$ to generate $2^4 S_m$; adding said weighted summation $2^4 S_m$ and said product $P_m$ to generate a summation $\Sigma_m$ thereof; incrementing said summation $\Sigma_m$ by $2^8$ so that the same equals $(P_m+2^4 S_m+2^8)$; adding the exponents and incrementing the same by plus one $(+1)$ for each generated carry bit $x_c$ and $h_c$ to generate a summation $\Sigma_e$; and shifting said summation $\Sigma_m$ by a number of bit places equal to the value of said summation $\Sigma_e$ to generate the product of the factors.

24. A method as in claim 23, wherein pluralities of pairs of factors are multiplied, including the steps of summing a plurality of products of the factors, comparing the sign bits of the factors of each pair, and controlling the step of summing a plurality of the factor products in order to add or subtract each product to or from the summation in accordance with the sign bits being like or unlike, respectively.

25. A method as in claim 24, including the step of subtracting the summation of the plurality of factor products from the echo signal on the echo path.

26. A method of multiplying first and second A-law encoded binary factors, wherein one factor represents a signal that causes an echo on an echo path of a transmission system and the other the impulse response of the system, in order to generate an echo estimate for subtraction from the echo on the echo path, and wherein the first factor has an exponent $x_e$ which equals zero, a mantissa $x_m$ having a value less than the maximum step value for the range of A-law encoding used and a sign bit, and the second factor has a non-zero exponent $h_e$, a mantissa $h_m$ and a sign bit, comprising the steps of incrementing each of the mantissas to generate the quantities $(x_m+1)$ and $(h_m+1)$; generating a carry bit $h_c$ whenever the mantissa $h_m$ has the maximum step value; multiplying said quantities to generate a product $P_m$ thereof; weighting said quantity $(x_m+1)$ by $2^4$ to generate $2^4(x_m+1)$; adding said weighted quantity $2^4(x_m+1)$ and said product $P_m$ to generate a summation $\Sigma_m$ thereof; generating an output signal $\Sigma_e$ which equals $(h_e+1)$ if said carry bit $h_c$ is inactive or $(h_e+2)$ if said carry bit $h_c$ is active; and shifting said summation $\Sigma_m$ by a number of bit places equal to the value of said summation $\Sigma_e$ to generate the product of the factors.

27. A method as in claim 26, wherein pluralities of pairs of factors are multiplied, including the steps of summing a plurality of products of the factors, comparing the sign bits of the factors of each pair, and controlling the step of summing a plurality of the factor products in order to add or subtract each product to or from the summation in accordance with the sign bits being like or unlike, respectively.

28. A method as in claim 27, including the step of subtracting the summation of the plurality of factor products from the echo signal on the echo path.

29. A method of multiplying first and second A-law encoded binary factors, wherein one factor represents a signal that causes an echo on an echo path of a transmission system and the other the impulse response of the system, in order to generate an echo estimate for subtraction from the echo on the echo path, and wherein the factors have exponents equal to zero, respective mantissas $x_m$ and $h_m$ each having a value less than the maximum step value for the range of A-law encoding used and sign bits, comprising the steps of incrementing each of the mantissas to generate the quantities $(x_m+1)$ and $(h_m+1)$; multiplying said quantities to generate a product $P_m$ thereof; and shifting said product $P_m$ by two bit places to generate the product of the factors.

30. A method as in claim 29, wherein pluralities of pairs of factors are multiplied, including the steps of summing a plurality of products of the factors, comparing the sign bits of the factors of each pair, and controlling the step of summing a plurality of the factor products in order to add or subtract each product to or from the summation in accordance with the sign bits being like or unlike, respectively.

31. A method as in claim 30, including the step of subtracting the summation of the plurality of factor products from the echo signal on the echo path.

32. A system for multiplying first and second multibit factors quantized in confirmity with a pseudologarithmic compression characteristic, wherein each factor has an exponent and a mantissa, comprising first circuit means for receiving the mantissas and for generating a data signal having a value in accordance with a summation of (a) the sum of the mantissas and (b) the product of the mantissas, said first circuit means also generating exponent carry signals as required by the values of the mantissas; second circuit means for receiving the exponents and the carry signals and for generating a control signal having a value in accordance with the sum thereof; and shifter circuit means for receiving said data and said control signals, said shifter circuit means having a plurality of outputs greater in number than the number of bits in said data signal and generating said data signal at individual ones of said outputs in accordance with the value of said control signal.

33. A system as in claim 32, wherein said first factor has an exponent $x_e$ and a mantissa $x_m$, said second factor has an exponent $h_e$ and a mantissa $h_m$, and wherein said data signal generated by said first circuit means comprises the summation of (a) the sum of $(x_m+1)$ and $(h_m+1)$ and (b) the product of $(x_m+1)$ and $(h_m+1)$.

34. A system as in claim 33, wherein a first carry signal is generated whenever $(x_m+1)$, and a second carry signal is generated whenever $(h_m+1)$, equal the maximum step value for the range of pseudo-logarithmic quantizing used.

35. A method of multiplying first and second multibit factors quantized in conformity with a pseudo-logarithmic compression characteristic, wherein one factor represents a signal that causes an echo on a echo path of a transmission system and the other the impulse response of the system, to generate an echo estimate for subtraction from the echo on the echo path, and wherein each factor has an exponent and a mantissa, comprising the steps of summing signals respresentative of (a) the sum of the mantissas and (b) the product of the mantissas to generate a data signal, generating exponent carry signals as required by the values of the mantissas; summing the exponents and said carry signals to generate a control signal; and shifting said data signal by a number of bit places equal to the value of said control signal to generate the product of the factors.

36. A method as in claim 35, wherein said first factor has an exponent $x_e$ and a mantissa $x_m$ and said second factor has an exponent $h_e$ and a mantissa $h_m$, and wherein said step of generating said data signal comprises generating the summation of (a) the sum of $(x_m+1)$ and $(h_m+1)$ and (b) the product of $(x_m+1)$ and $(h_m+1)$.

37. A method as in claim 36, wherein said step of generating exponent carry signals comprises generating a first carry signal whenever $(x_m+1)$, and a second carry signal whenever $(h_m+1)$, equal the maximum step value for the range of pseudo-logarithmic quantizing used.

* * * * *